(12) United States Patent
Chu

(10) Patent No.: US 9,615,387 B2
(45) Date of Patent: Apr. 4, 2017

(54) CONNECTION METHOD AND ELECTRONIC DEVICE

(71) Applicant: Wistron Corporation, New Taipei (TW)

(72) Inventor: Chun-Ta Chu, New Taipei (TW)

(73) Assignee: Wistron Corporation, New Taipei (TW)

( * ) Notice: Subject to any disclaimer, the term of this patent is extended or adjusted under 35 U.S.C. 154(b) by 122 days.

(21) Appl. No.: 14/664,903

(22) Filed: Mar. 22, 2015

(65) Prior Publication Data

US 2016/0095142 A1    Mar. 31, 2016

(30) Foreign Application Priority Data

Sep. 26, 2014    (TW) .............................. 103133508 A

(51) Int. Cl.
| | | |
|---|---|---|
| *H04L 12/26* | (2006.01) | |
| *H04W 76/02* | (2009.01) | |
| *H04W 72/12* | (2009.01) | |

(52) U.S. Cl.
CPC ....... *H04W 76/02* (2013.01); *H04W 72/1215* (2013.01); *H04W 72/1247* (2013.01)

(58) Field of Classification Search
USPC ....... 370/229, 230, 235, 252, 328, 437, 465, 370/466
See application file for complete search history.

(56) References Cited

U.S. PATENT DOCUMENTS 5,541,919 A * 7/1996 Yong ........................ H04J 3/247
370/416

7,046,649 B2    5/2006 Awater et al.
(Continued)

FOREIGN PATENT DOCUMENTS

| CN | 102769919 | 11/2012 |
|---|---|---|
| CN | 103124423 | 5/2013 |

(Continued)

OTHER PUBLICATIONS

"Office Action of Taiwan Counterpart Application" with partial English translation, issued on Feb. 24, 2016, p. 1-p. 12, in which the listed references were cited.

*Primary Examiner* — Kwang B Yao
*Assistant Examiner* — Nguyen Ngo
(74) *Attorney, Agent, or Firm* — Jianq Chyun IP Office

(57) ABSTRACT

A connection method, adapted for an electronic device is provided. The connection method includes the following steps: when the electronic device simultaneously performs a first wireless transmission and a second transmission through a first wireless communication protocol and a second wireless communication protocol respectively, determining a priority order of a first transmission event in the first wireless transmission and a second transmission event in the second wireless transmission; when the priority order of the first transmission event is higher than the priority order of the second transmission event, interrupting the second wireless transmission; when the first transmission event is finished, comparing the priority order of the second transmission event and a third transmission event in the first wireless transmission; when the priority order of the second transmission event is higher than the priority order of the third transmission event, interrupting the first wireless transmission and enabling the second wireless transmission.

14 Claims, 3 Drawing Sheets

(56) References Cited

U.S. PATENT DOCUMENTS

| | | |
|---|---|---|
| 7,725,118 B2 * | 5/2010 | Yang .................... H04W 16/14 370/447 |
| 8,223,693 B2 | 7/2012 | Ko et al. |
| 8,787,468 B2 | 7/2014 | Truong et al. |
| 9,313,804 B1 * | 4/2016 | de la Broise ............ H04B 1/40 |
| 2005/0276241 A1 | 12/2005 | Kamerman et al. |
| 2006/0133334 A1 * | 6/2006 | Ross ................. H04W 72/1215 370/338 |
| 2007/0099567 A1 * | 5/2007 | Chen .................... H04W 92/02 455/41.2 |
| 2007/0135162 A1 * | 6/2007 | Banerjea ............. H04W 76/026 455/556.1 |
| 2007/0275746 A1 * | 11/2007 | Bitran ................. H04W 72/0446 455/509 |
| 2008/0051085 A1 * | 2/2008 | Ganton ................. H04W 88/06 455/435.2 |
| 2008/0161031 A1 * | 7/2008 | Tu ..................... H04W 72/1215 455/512 |
| 2009/0081962 A1 * | 3/2009 | Sohrabi ............. H04W 72/1242 455/79 |
| 2010/0115167 A1 * | 5/2010 | Tardieux ............... G06F 13/362 710/240 |
| 2010/0202416 A1 * | 8/2010 | Wilhelmsson .... H04W 72/1215 370/336 |
| 2012/0082142 A1 * | 4/2012 | Kim ..................... H04W 72/10 370/336 |
| 2012/0176968 A1 | 7/2012 | Luna |

FOREIGN PATENT DOCUMENTS

| | | |
|---|---|---|
| CN | 101932011 | 10/2013 |
| CN | 103702434 | 4/2014 |

\* cited by examiner

CONNECTION METHOD AND ELECTRONIC DEVICE

CROSS-REFERENCE TO RELATED APPLICATION

This application claims the priority benefit of Taiwan application serial no. 103133508, filed on Sep. 26, 2014. The entirety of the above-mentioned patent application is hereby incorporated by reference herein and made a part of this specification.

BACKGROUND

Technical Field

The invention relates to an electronic device, and particularly relates to an electronic device and a connection method thereof.

Related Art

Along with quick development of handheld electronic devices and wireless communication techniques, it is common for a single handheld electronic device to support a plurality of wireless communication protocols, and frequency bands used by the wireless communication protocols are probably close or overlapped to each other. For example, a usage frequency band of 802.11b/g in a WiFi standard and a bluetooth (BT) standard that are commonly used by the current handheld electronic devices all use the frequency band around 2.4 GHz. If the WiFi and the BT are simultaneously used to transmit wireless signals, a transmission speed of a WiFi signal or a BT signal is greatly influenced. If a distance between a WiFi transceiver module and a BT transceiver module is expanded, the aforementioned signal influence is probably mitigated, though it conflicts with a development trend of lightness, slimness, shortness and smallness of the handheld electronic device, so that a design difficulty is increased. Moreover, since signal processing modules of the WiFi and the BT are generally integrated into a same chip, and antennas thereof are integrated into a same antenna, the problem of signal influence and interference is difficult to be resolved.

SUMMARY

The invention is directed to a connection method and an electronic device, by which probability of signal interference between two or a plurality of wireless communication protocols with closed frequency bands is decreased.

The invention provides a connection method, which is adapted to an electronic device, where the electronic device supports a first wireless transmission of a first wireless communication protocol and a second wireless transmission of a second wireless communication protocol, and a usage frequency band of the first wireless communication protocol is close or overlapped to that of the second wireless communication protocol, and the connection method includes the following steps. When the electronic device simultaneously performs the first wireless transmission and the second transmission through the first wireless communication protocol and the second wireless communication protocol respectively, a priority order of a first transmission event in the first wireless transmission and a second transmission event in the second wireless transmission is determined. When the priority order of the first transmission event is higher than the priority order of the second transmission event, the second wireless transmission is interrupted. When the first transmission event is finished, the priority order of the second transmission event and a third transmission event in the first wireless transmission are compared. When the priority order of the third transmission event is lower than the priority order of the second transmission event, the first wireless transmission is interrupted and the second wireless transmission is enabled.

The invention provides an electronic device including an antenna module, a first wireless communication module, a second wireless communication module and a processing unit. The first wireless communication module is coupled to the antenna module and supports a first wireless communication protocol. The second wireless communication module is coupled to the antenna module and supports a second wireless communication protocol, where a usage frequency band of the first wireless communication protocol is close or overlapped to that of the second wireless communication protocol. The processing unit is coupled to the first wireless communication module and the second wireless communication module, and performs a first wireless transmission and a second wireless transmission through the first wireless communication module and the second wireless communication module respectively. When the processing unit simultaneously performs the first wireless transmission and the second wireless transmission through the first communication module and the second communication module, the processing unit determines a priority order of a first transmission event in the first wireless transmission and a second transmission event in the second wireless transmission. When the processing unit determines that the priority order of the first transmission event is higher than the priority order of the second transmission event, the processing unit interrupts the second wireless transmission. When the processing unit finishes the first transmission event, the processing unit compares the priority order of the second transmission event and a third transmission event in the first wireless transmission. When the processing unit determines that the priority order of the third transmission event is lower than the priority order of the second transmission event, the processing unit interrupts the first wireless transmission and enables the second wireless transmission.

According to the above descriptions, the invention provides a connection method and an electronic device, by which when the wireless transmissions are performed through different wireless communication protocols, a part of the wireless transmission function is selectively interrupted according to the priority order of data transmitted in the wireless transmissions, so as to mitigate the signal interference between different wireless communication protocols.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Taking an electronic device capable of simultaneously transceiving a wireless signal complied with a wireless fidelity (WiFi) protocol and a wireless signal complied with a bluetooth (BT) protocol as an example, in the BT protocol, a frequency hopping algorithm is initially used to process interference, though one Wi-Fi network connection (for example, a wireless signal compatible with IEEE 802.11b/g with a frequency band overlapped to that of the wireless signal of the BT protocol) can severely interfere 25% of the BT channel. Due to packet loss caused by overlapping of usage bandwidths and transmission channels, the corresponding packets have to be re-transmitted through a quiet channel, an amount of data transmitted through the wireless signal of the BT protocol is largely decreased.

Then, in a version 1.2 of the BT protocol, an adaptive frequency hopping (AFH) algorithm is used as an equipment test and interference prevention mechanism for a BT signal transceiver module. However, when the BT signal transceiver module and a WiFi signal transceiver module coexist in a same electronic device, the AFH algorithm is not enough to implement coexistence of the BT protocol and the WiFi protocol. A main reason thereof is that the wireless signal complied with the WiFi protocol has to be provided with a higher output power in order to support data transmission with a long distance and a high transmission rate compared with that of the BT signal. The BT signal originally requiring a low power is easily influenced by the aforementioned high power WiFi signal.

On the other hand, although the power of the BT signal transceiver module is lower than the power of the WiFi signal transceiver module, due to a close distance therebetween, the BT signal can also influence the WiFi signal. For example, the BT signal transceiver module periodically scans each channel to learn a usage status of each channel. The WiFi signal can be influenced by the above scan operation, such that a signal strength thereof is decreased.

Therefore, in the invention, the wireless signals complied with two (or more than two) wireless communication protocols in the electronic device are integrated, and transmission of the two (or more than two) wireless communication protocols is ordered by time. In this way, transmission of the two wireless signals can be individually arranged, so as to minimize the conflict and interference therebetween.

Figure 1:
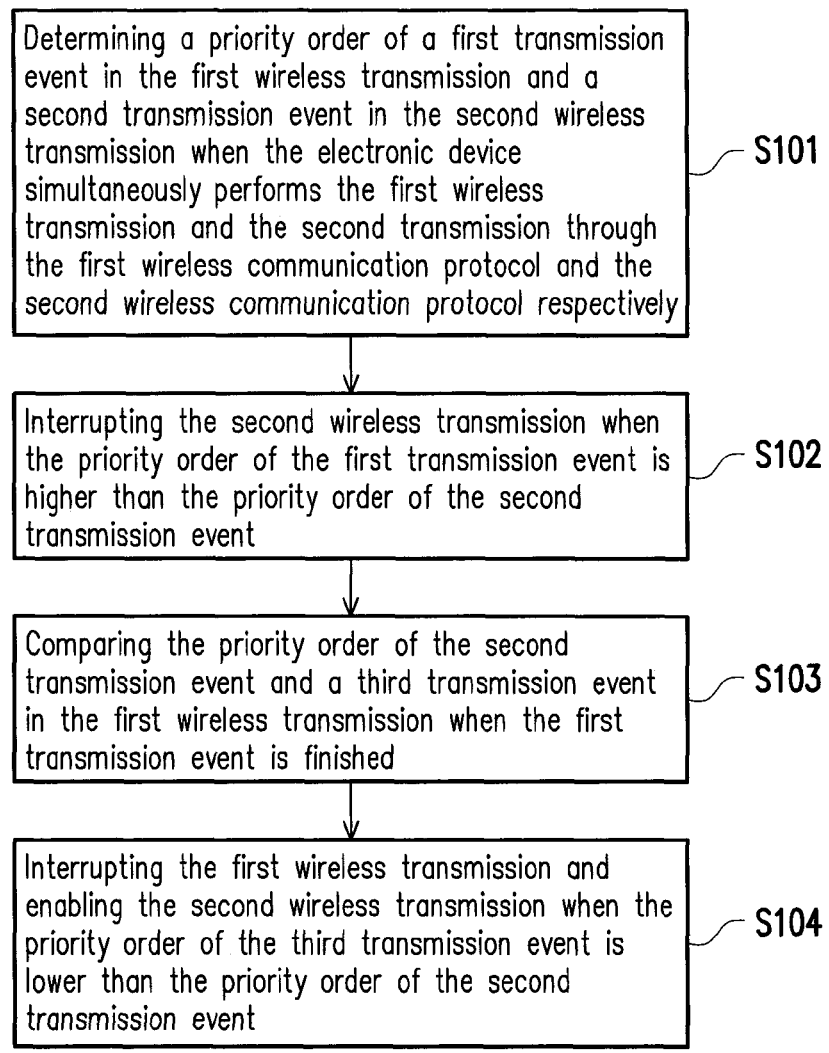
FIG. 1 is a flowchart illustrating a connection method according to an embodiment of the invention.

FIG. 1 is a flowchart illustrating a connection method according to an embodiment of the invention. The connection method is adapted to an electronic device, and the electronic device supports a first wireless transmission of a first wireless communication protocol and a second wireless transmission of a second wireless communication protocol, and a usage frequency band of the first wireless communication protocol is close or overlapped to that of the second wireless communication protocol. Namely, the electronic device can simultaneously connect an Internet access point or another electronic device to implement data exchange and transmission through the first wireless communication protocol and the second wireless communication protocol.

Referring to FIG. 1, when the electronic device simultaneously performs the first wireless transmission and the second transmission through the first wireless communication protocol and the second wireless communication protocol respectively, a priority order of a first transmission event in the first wireless transmission and a second transmission event in the second wireless transmission is determined (step S101). When the priority order of the first transmission event is higher than the priority order of the second transmission event, the second wireless transmission is interrupted (step S102). When the first transmission event is finished, the priority order of the second transmission event and a third transmission event in the first wireless transmission are compared (step S103). When the priority order of the third transmission event is lower than the priority order of the second transmission event, the first wireless transmission is interrupted and the second wireless transmission is enabled (step S104). When the priority order of the third transmission event is higher than the priority order of the second transmission event, the first wireless transmission is maintained to carry on the third transmission event, and interruption of the second wireless transmission is maintained.

Figure 2:
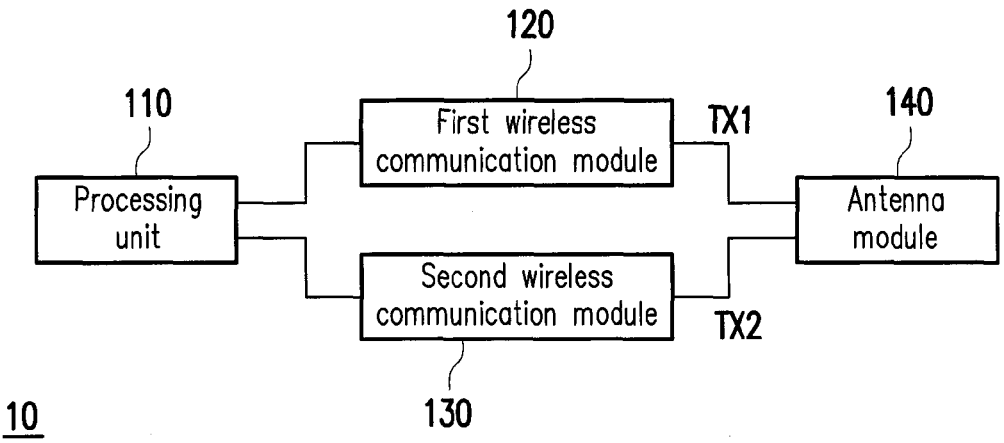
FIG. 2 is a functional block diagram of an electronic device according to an embodiment of the invention.

FIG. 2 is a functional block diagram of an electronic device according to an embodiment of the invention. Referring to FIG. 2, the electronic device 10 includes an antenna module 140, a first wireless communication module 120, a second wireless communication module 130 and a processing unit 110. The first wireless communication module 120 is coupled to the antenna module 140 and supports a first wireless communication protocol. The second wireless communication module 130 is coupled to the antenna module 140 and supports a second wireless communication protocol, where a usage frequency band of the first wireless communication protocol is close or overlapped to that of the second wireless communication protocol. For example, one of the first wireless communication protocol and the second wireless communication protocol is a WiFi protocol, and another one is a bluetooth (BT) protocol, though the invention is not limited thereto. Close of the usage frequency bands of the first wireless communication protocol and the second wireless communication protocol refers to that a difference between the usage frequency band of the first wireless communication protocol and the usage frequency band of the second wireless communication protocol is smaller than 0.2 MHz, for example, when the first wireless communication protocol is the WiFi protocol, the usage frequency band of channel six is within a frequency range of 2426 MHz to 2448 MHz, and when the second wireless communication protocol is the BT protocol, the usage frequency band thereof is within a frequency range of 2448.1 MHz to 2449.1 MHz, and the difference between the usage frequency bands of the first and second wireless communication protocols is smaller than 0.2 MHz, i.e. the usage frequency bands are close. However, the difference between the frequency ranges of the usage frequency bands is not limited thereto, which can also be set to be smaller than 0.1 MHz or 0.5 MHz. Overlap of the usage frequency bands of the first wireless communication protocol and the second wireless communication protocol refers to that the usage frequency band of the first wireless communication protocol may be partially or completely overlapped with the usage frequency band of the second wireless communication protocol. For example, when the first wireless communication protocol is the BT protocol, the usage frequency is within the frequency range of 2400.5 MHz to 2401.5 MHz, and when the second wireless communication protocol is the WiFi protocol, the usage frequency band of a first channel is within the frequency range of 2401 Mz to 2423 MHz, such that the usage frequency bands of the first wireless communication protocol and the second wireless communication protocol are partially overlapped, which is the overlap of the usage frequency bands. However, the overlap of the usage frequency bands is not limited to the aforementioned partial overlap or complete overlap. The antenna module 140 may include a two antennas respectively corresponding to the first communication module 120 and the second communication module 130, or the first communication module 120 and the second communication module 130 can share a same antenna, which is not limited by the invention.

The processing unit 110 can be a central processor of the electronic device, or can be a processor independent to the central processor. The processing unit 110 is coupled to the first wireless communication module 120 and the second wireless communication module 130, and performs a first wireless transmission TX1 and a second wireless transmission TX2 through the first wireless communication module 120 and the second wireless communication module 130, respectively. When the processing unit 110 simultaneously performs the first wireless transmission TX1 and the second wireless transmission TX2 through the first communication module 120 and the second communication module 130, the processing unit 110 determines a priority order of a first transmission event in the first wireless transmission TX1 and a second transmission event in the second wireless transmission TX2. When the processing unit 110 determines that the priority order of the first transmission event is higher than the priority order of the second transmission event, the processing unit 110 interrupts the second wireless transmission TX2. When the processing unit 110 finishes the first transmission event, the processing unit 110 compares the priority order of the second transmission event and a third transmission event in the first wireless transmission TX1.

The transmission events can be classified according to types thereof, and different types of the transmission events correspond to different priority orders. Setting of the priority orders can be predefined in the processing unit 110, though the invention is not limited thereto. The transmission events include a voice call transmission event, a video audio streaming transmission event, a webpage data transmission event and a file data transmission event. A priority order of the above types of transmission events can be set as the voice call transmission event>the video audio streaming transmission event>the webpage data transmission event>the file data transmission event.

The determination of the priority order can be implemented through package analysis. In the present embodiment, the processing unit 110 can analyse packets corresponding to each of the transmission events at an application layer, for example, headers of the packets in the first wireless transmission and the second wireless transmission (packet headers of the WiFi protocol and the BT protocol) are analysed to obtain a data type of the transmission event and related profile, and communication protocol and service, etc., for example, a data flow classification, a type of service, a protocol, a protocol number, a source address, a destination address, etc. The processing unit 110 can define various type of the transmission events according to different compositions of the header field, and the processing unit 110 can further determine the priority order of each transmission event according to the type of the transmission event.

For example, a header of the BT signal can be used to identify a packet type and protocol information. A header of the WiFi signal includes the type of service and the protocol number. Preset rules of the present embodiment are shown in a following table 1.

TABLE 1

| Priority order | Type | Corresponding profile, communication protocol or service |
|---|---|---|
| 1 | Voice call transmission event | HSP(Headset Profile, BT)/HFP(Hands-Free Profile, BT)/VoIP(Voice over IP, WiFi) |
| 2 | Medical related transmission event | HDP(Health Device Profile, BT) |
| 3 | Connection related transmission event | TLS(Transport Layer Security, WiFi)/SSL(Secure Sockets Layer, WiFi) |
| 4 | Video audio streaming transmission event | A2DP (Advanced Audio Distribution Profile, BT)/ AVRCP(Audio/Video Remote Control Profile, BT)/RTP(Real-time Transport Protocol, WiFi) |
| 5 | Webpage data transmission event | HTTP (Hypertext Transfer Protocol, WiFi) |
| 6 | File data transmission event | OBEX(OBject Exchange, BT)/BIP(Basic Imaging Profile, BT)/OPP(Object Push Profile, BT)/FTP(File Transfer Protocol, WiFi) |

When the processing unit 110 determines that the priority order of the third transmission event is lower than the priority order of the second transmission event, the processing unit 110 interrupts the first wireless transmission TX1 and enables the second wireless transmission TX2.

In brief, the processing unit 110 determines the transmission event having a higher priority order in the two wireless transmissions, and interrupts the other wireless transmission. For example, the first wireless communication protocol is the WiFi protocol, and the second wireless communication protocol is the BT protocol, when the wireless transmission of the WiFi protocol has the transmission event with higher priority order, the second wireless transmission performed through the BT protocol is interrupted by the processing unit 110.

However, the priority order therein can be adjusted according to an actual requirement, in which the profiles and communication protocols used for classification are only used as an example, and the invention is not limited to only use the profiles shown in the table 1 to classify the transmission events.

It should be noticed that the transmission event having higher priority order does not necessarily occupy all of the bandwidth. When a connection bandwidth of a current wireless transmission (for example, the first wireless transmission) is greater than an occupied bandwidth of the transmission event with the highest priority order, the processing unit 110 can simultaneously carry on at least one of the other transmission events in the first wireless transmission according to the priority order.

For example, the first wireless transmission includes a voice call transmission event, and two file data transmission events, and the second wireless transmission includes one webpage data transmission event, where an occupied bandwidth of the voice call transmission event is smaller than the connection bandwidth of the first wireless transmission. Therefore, in case that the second wireless transmission is interrupted and the first wireless transmission is maintained after the comparison of the step S102 of FIG. 1, the processing unit 110 can still carry on performing the file dada transmission event in the first wireless transmission according to the priority order by using the bandwidth other than the occupied bandwidth of the voice call transmission event, even if the priority order of the file data transmission events is lower than that of the webpage data transmission event in the second wireless transmission.

After the voice call transmission event is finished, the processing unit 110 re-compares the priority order of the remaining transmission events (the file data transmission events in the first wireless transmission and the webpage data transmission event in the second wireless transmission), and re-decides which of the transmission events to be transmitted in the first wireless transmission and the second wireless transmission and which of the transmission events to be interrupted. Alternatively, in an embodiment of the invention, considering a time slot (which is about 625 μs) of the BT signal and power saving of the electronic device 10, the processing unit 110 re-compares and re-schedules the priority order of the transmission events every integer multiple of the time slot of the BT signal (for example, 1.25 s), though the invention is not limited thereto. It should be noticed that since reconnection consumes a plurality of signalling exchanges, the aforementioned interrupt operation performed to the first wireless transmission or the second wireless transmission according to the priority order is not equivalent to disconnection, which can be regarded as that the transmission event is placed in a transmission register (not shown) in the first communication module 120 or the second communication module 130 to wait for transmission.

In an embodiment of the invention, the processing unit 110 executes the mechanism shown in FIG. 1-FIG. 2 when determining that one of the first wireless transmission and the second wireless transmission is interfered by the other one. For example, when a signal strength of the WiFi signal of the first wireless transmission is lower than a first threshold, or when the BT communication module (i.e. the second communication module 130) determines that the number of current applicable channels is lower than a second threshold (for example, less than two channels).

Figure 3:
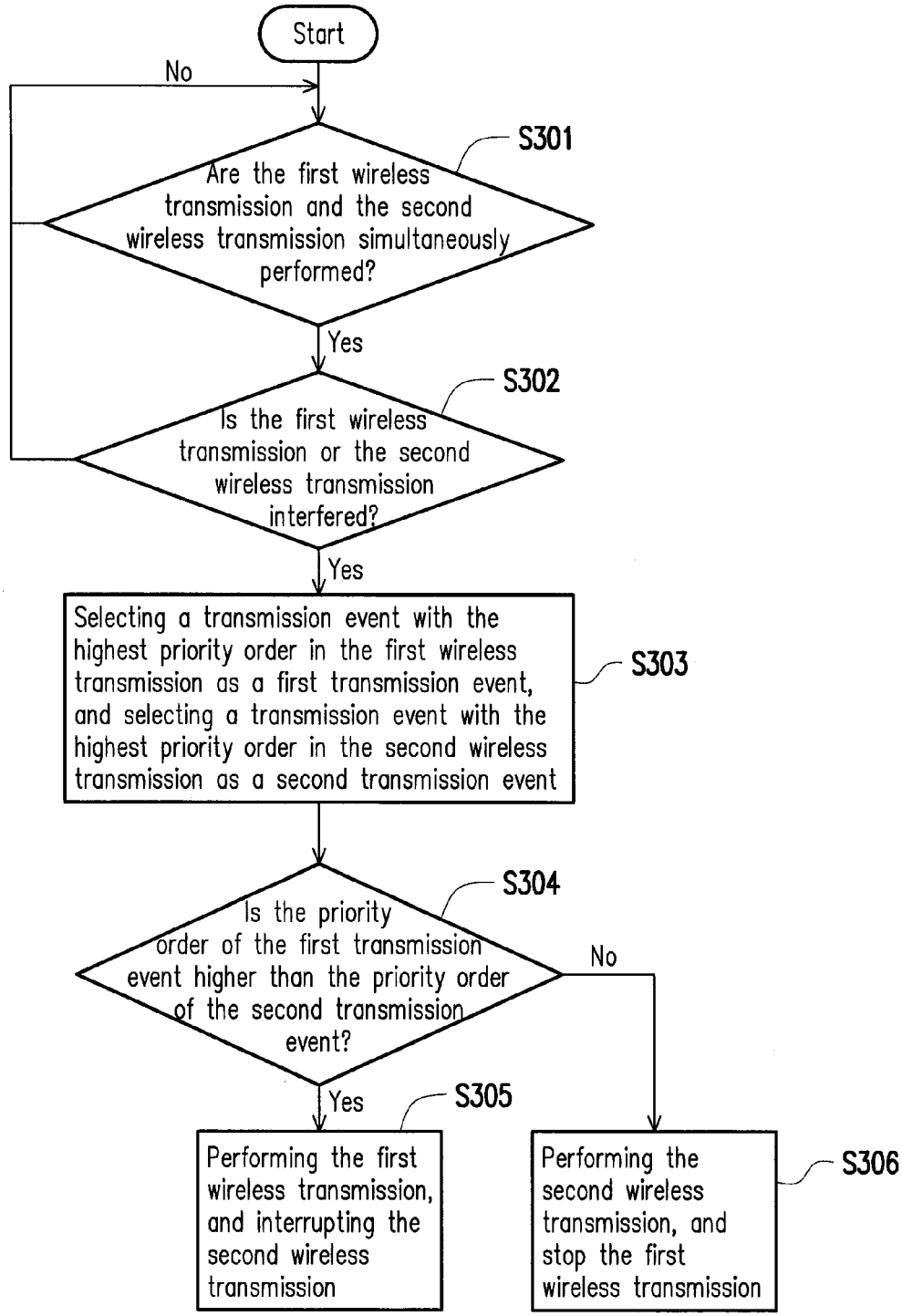
FIG. 3 is a flowchart illustrating a connection method according to an embodiment of the invention.

FIG. 3 is a flowchart illustrating a connection method according to an embodiment of the invention. Referring to FIG. 1 and FIG. 3, first, the processing unit 110 determines whether to simultaneously perform the first wireless transmission TX1 and the second wireless transmission TX2 through the first wireless communication module 120 and the second wireless communication module 130 (step S301). If yes, the processing unit 110 further determines whether the current first wireless transmission TX1 and/or the second wireless transmission TX2 are/is interfered (step S302). If the processing unit 110 determines that the first wireless transmission TX1 and/or the second wireless transmission TX2 are/is interfered, the processing unit 110 selects a transmission event with the highest priority order in the first wireless transmission TX1 as a first transmission event, and selects a transmission event with the highest priority order in the second wireless transmission TX2 as a second transmission event (step S303).

Then, the processing unit 110 further determines whether the priority order of the first transmission event is higher than the priority order of the second transmission event (step S304). When the processing unit 110 determines that the priority order of the first transmission event is higher than the priority order of the second transmission event, the processing unit 110 keeps performing the first wireless transmission TX1 through the first communication module 120, and interrupts the second wireless transmission TX2 (step S305). When the processing unit 110 determines that the priority order of the first transmission event is lower than the priority order of the second transmission event, the processing unit 110 performs the second wireless transmission TX2 through the second communication module 130 and stops performing the first wireless transmission TX1 thought the first communication module 120 (step S306). The above steps S301-S306 can be periodically executed and the time interval can be the aforementioned integer multiple of the time slot of the BT signal.

Figure 4:
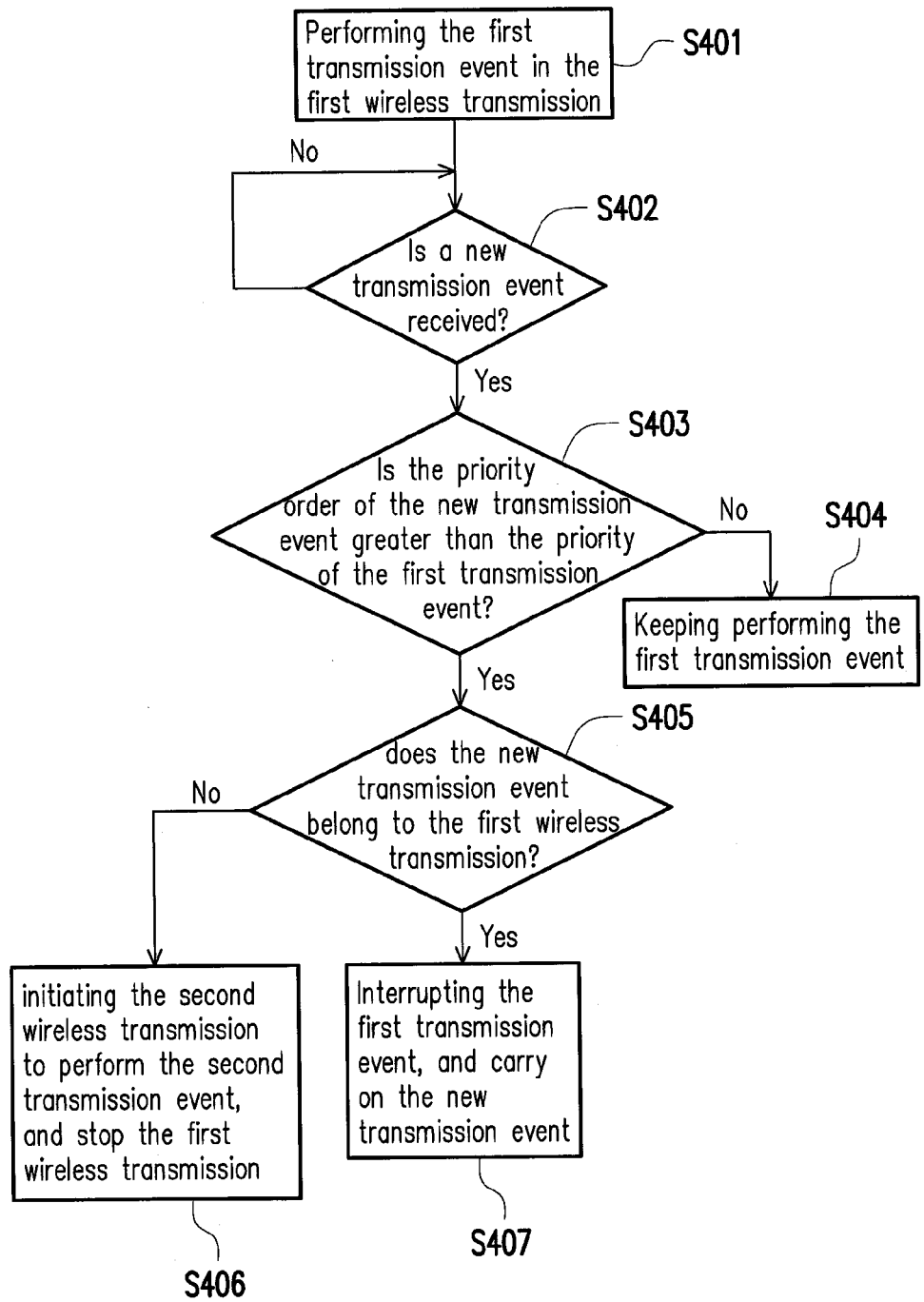
FIG. 4 is a flowchart illustrating a connection method according to an embodiment of the invention.

FIG. 4 is a flowchart illustrating a connection method according to an embodiment of the invention. Different to the embodiment of FIG. 3, in the embodiment of FIG. 4, the processing unit 110 does not periodically determine whether the first wireless transmission or the second wireless transmission is interfered, but periodically checks whether the first wireless transmission or the second wireless transmission includes a new transmission event, and determines whether to interrupt/enable the wireless transmission according to the new transmission event.

Referring to FIG. 1 and FIG. 4, first, the processing unit 110 carries on performing the first transmission event in the first wireless transmission TX1 through the first communication module 120, where the first transmission event is a transmission event with the highest priority order in the first wireless transmission TX1 (step S401). Then, the processing unit 110 periodically determines whether a new transmission event is received, which is, for example, sent by an operating system or an application program executed by the central processor in the electronic device 10, or received through the first communication module 120 or the second communication module 130 (step S402). If yes, the processing unit 110 further analyses the new transmission event, and determines whether the priority order of the new transmission event is higher than the priority order of the first transmission event (step S403).

When the processing unit 110 determines that the priority order of the new transmission event is lower than the priority order of the first transmission event, the processing unit 110 keeps performing the first transmission event (step S404). When the processing unit 110 determines that the priority order of the new transmission event is higher than the priority order of the first transmission event (step S405, yes), the processing unit 110 further determines whether the new transmission event belongs to the first wireless transmission TX1 (step S405). If the new transmission event does not belong to the first wireless transmission TX1 but belongs to the second wireless transmission TX2, the processing unit 110 carries on performing the new transmission event by enabling the second wireless transmission TX2 through the second communication module 130, and interrupts the first wireless transmission TX1. On the other hand, when the priority order of the new transmission event is higher than the priority order of the first transmission event, and the new transmission event and the first transmission event all belong to the first wireless transmission TX1, the processing unit 110 interrupts the first transmission event, for example, stores the first transmission event in a transmission register of the first communication module 120, and carries on performing the new transmission event (step S407).

In the present embodiment, the first wireless communication protocol corresponding to the first communication module 120 can be the WiFi protocol, and the second wireless communication protocol corresponding to the second communication module 130 can be the BT protocol, and vice versa. Moreover, different determination methods used in the embodiments of FIG. 3 and FIG. 4 can also be mixed according to an actual requirement, which is not limited by the invention.

It should be noticed that when the priority orders of the transmission events with the highest priority orders in the first wireless transmission and the second wireless transmission are the same, for example, the transmission events are all the voice call transmission events, the processing unit 110 can carry on the transmission events belonging to two different wireless transmissions through a time-division multiplexing manner. For example, while the user operates the electronic device 10 to connect a server of the Internet through the WiFi communication module (for example, the first communication module 120) to start a network voice call, and simultaneously operates the electronic device 10 to connect a BT headset through the BT communication module (for example, the second communication module 130), the processing unit 110 of the electronic device 10 transmits voice data of the network voice call to the BT headset from the server of the Internet through the electronic device 10 in the time-division multiplexing manner, and vice versa.

In summary, the invention provides a connection method and an electronic device, by which when the WiFi signal or the BT signal is interfered, one of the WiFi signal or the BT signal is selected according to a priority order to continually perform the wireless transmission, and transmission of the other one is interrupted, so as to minimize the mutual interference between the WiFi signal and the BT signal. When the WiFi signal transceiver module (for example, the first communication module) and the BT signal transceiver module (for example, the second communication module) in the electronic device transfer signals through the same antenna (i.e. the antenna module only includes the antenna commonly used by the two communication modules), according to the configuration of the invention, signal transceiving efficiency of the WiFi signal transceiver module and the BT signal transceiver module can be obviously improved. Moreover, when the electronic device supports the other wireless communication protocols with close or overlapped usage frequency bands, deduced according to the configuration of the invention, the similar effect is achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A connection method, adapted to an electronic device, wherein the electronic device supports a first wireless transmission of a first wireless communication protocol and a second wireless transmission of a second wireless communication protocol, and a usage frequency band of the first wireless communication protocol is close or overlapped to the usage frequency band of the second wireless communication protocol, the connection method comprising:

determining a priority order of a first transmission event in the first wireless transmission and a second transmission event in the second wireless transmission when the electronic device simultaneously performs the first wireless transmission and the second transmission through the first wireless communication protocol and the second wireless communication protocol respectively;

interrupting the second wireless transmission when the priority order of the first transmission event is higher than the priority order of the second transmission event;

comparing the priority order of the second transmission event and a third transmission event in the first wireless transmission when the first transmission event is finished; and interrupting the first wireless transmission and enabling the second wireless transmission when the priority order of the third transmission event is lower than the priority order of the second transmission event, wherein the first wireless transmission and the second wireless transmission respectively comprise a plurality of transmission events, and before the step of determining the priority order of the first transmission event in the first wireless transmission and the second transmission event in the second wireless transmission, the method further comprises:

selecting the transmission event with the highest priority order in the first wireless transmission as the first transmission event; and selecting the transmission event with the highest priority order in the second wireless transmission as the second transmission event, wherein when the first transmission event in the first wireless transmission is performed, and a connection bandwidth of the first wireless transmission is greater than an occupied bandwidth of the first transmission event, at least one of the transmission events in the first wireless transmission is simultaneously performed according to the priority order.

2. The connection method as claimed in claim 1, wherein before the step of determining the priority order of the first transmission event in the first wireless transmission and the second transmission event in the second wireless transmission, the method further comprises:

determining whether the first wireless transmission or the second wireless transmission is interfered.

3. The connection method as claimed in claim 2, wherein the step of determining that the first wireless transmission or the second wireless transmission is interfered comprises:

determining that a signal strength of the first wireless transmission is lower than a first threshold, or a number of applicable channels of the first wireless transmission is lower than a second threshold; and determining that the signal strength of the second wireless transmission is lower than the first threshold, or the number of the applicable channels of the second wireless transmission is lower than the second threshold.

4. The connection method as claimed in claim 1, wherein before the step of comparing the priority order of the second transmission event and the third transmission event in the first wireless transmission, the method further comprises:

selecting the transmission event with the highest priority order in the first wireless transmission besides the finished first transmission event as the third transmission event; and maintaining the first wireless transmission to carry on the third transmission event and maintaining stopping the second wireless transmission when the priority order of the third transmission event is higher than that of the second transmission event.

5. The connection method as claimed in claim 1, wherein the transmission events comprise a voice call transmission event, a video audio streaming transmission event, a webpage data transmission event and a file data transmission event, wherein the priority order of the voice call transmission event is higher than the priority order of the video audio streaming transmission event, the webpage data transmission event and the file data transmission event.

6. The connection method as claimed in claim 1, wherein when the priority orders of the first transmission event and the second transmission event are the same, the first transmission event and the second transmission event are performed in a time-division multiplexing manner.

7. The connection method as claimed in claim 1, wherein close of the usage frequency bands of the first wireless communication protocol and the second wireless communication protocol refers to that a difference between the usage frequency band of the first wireless communication protocol and the usage frequency band of the second wireless communication protocol is smaller than 0.2 MHz; and overlap of the usage frequency bands of the first wireless communication protocol and the second wireless communication protocol refers to that the usage frequency band of the first wireless communication protocol is partially or completely overlapped with the usage frequency band of the second wireless communication protocol.

8. An electronic device, comprising:
an antenna module;
a first wireless communication module, coupled to the antenna module, and supporting a first wireless communication protocol;
a second wireless communication module, coupled to the antenna module, and supporting a second wireless communication protocol, wherein a usage frequency band of the first wireless communication protocol is close or overlapped to the usage frequency of the second wireless communication protocol; and
a processing unit, coupled to the first wireless communication module and the second wireless communication module, and performing a first wireless transmission and a second wireless transmission through the first wireless communication module and the second wireless communication module respectively,
wherein when the processing unit simultaneously performs the first wireless transmission and the second wireless transmission through the first communication module and the second communication module, the processing unit determines a priority order of a first transmission event in the first wireless transmission and a second transmission event in the second wireless transmission,
when the processing unit determines that the priority order of the first transmission event is higher than the priority order of the second transmission event, the processing unit interrupts the second wireless transmission, when the processing unit finishes the first transmission event, the processing unit compares the priority order of the second transmission event and a third transmission event in the first wireless transmission, when the processing unit determines that the priority order of the third transmission event is lower than the priority order of the second transmission event, the processing unit interrupts the first wireless transmission and enables the second wireless transmission, wherein the first wireless transmission and the second wireless transmission respectively comprise a plurality of transmission events;

the processing unit selects the transmission event with the highest priority order in the first wireless transmission as the first transmission event; and the processing unit selects the transmission event with the highest priority order in the second wireless transmission as the second transmission event, when the first transmission event in the first wireless transmission is performed, and a connection bandwidth of the first wireless transmission is greater than an occupied bandwidth of the first transmission event, the processing unit simultaneously performs at least one of the transmission events in the first wireless transmission according to the priority order.

9. The electronic device as claimed in claim 8, wherein when the processing unit determines that the first wireless transmission or the second wireless transmission is interfered, the processing unit determines the priority order of the first transmission event in the first wireless transmission and the second transmission event in the second wireless transmission.

10. The electronic device as claimed in claim 9, wherein when the processing unit determines that a signal strength of the first wireless transmission is lower than a first threshold, or a number of applicable channels of the first wireless transmission is lower than a second threshold, the processing unit determines that the first wireless transmission is interfered, and when the processing unit determines that the signal strength of the second wireless transmission is lower than the first threshold, or the number of the applicable channels of the second wireless transmission is lower than the second threshold, the processing unit determines that the second wireless transmission is interfered.

11. The electronic device as claimed in claim 8, wherein the processing unit selects the transmission event with the highest priority order in the first wireless transmission besides the finished first transmission event as the third transmission event; and when the priority order of the third transmission event is higher than that of the second transmission event, the processing unit maintains the first wireless transmission to carry on the third transmission event and maintains interrupting the second wireless transmission.

12. The electronic device as claimed in claim 8, wherein the transmission events comprise a voice call transmission event, a video audio streaming transmission event, a webpage data transmission event and a file data transmission event, wherein the priority order of the voice call transmission event is higher than the priority order of the video audio streaming transmission event, the webpage data transmission event and the file data transmission event.

13. The electronic device as claimed in claim 8, wherein when the priority orders of the first transmission event and the second transmission event are the same, the processing unit performs the first transmission event and the second transmission event in a time-division multiplexing manner.

14. The electronic device as claimed in claim 8, wherein close of the usage frequency bands of the first wireless communication protocol and the second wireless communication protocol refers to that a difference between the usage frequency band of the first wireless communication protocol and the usage frequency band of the second wireless communication protocol is smaller than 0.2 MHz; and overlap of the usage frequency bands of the first wireless communication protocol and the second wireless communication protocol refers to that the usage frequency band of the first wireless communication protocol is partially or completely overlapped with the usage frequency band of the second wireless communication protocol.

* * * * *